United States Patent [19]

Bailey, Jr.

[11] Patent Number: 4,623,674
[45] Date of Patent: Nov. 18, 1986

[54] POLYMER/POLYOLS OF SUBSTITUTED STYRENES AND POLYURETHANES MADE THEREFROM

[75] Inventor: Frederick E. Bailey, Jr., Charleston, W. Va.

[73] Assignee: Union Carbide Corporation, Danbury, Conn.

[21] Appl. No.: 747,187

[22] Filed: Jun. 21, 1985

[51] Int. Cl.$^4$ .............................................. C08G 18/14
[52] U.S. Cl. ..................................... 521/137; 524/714; 524/724; 524/762; 525/185; 525/187; 525/404; 525/455
[58] Field of Search ...................... 524/724, 714, 762; 525/185, 187, 404, 455; 521/137

[56] References Cited

U.S. PATENT DOCUMENTS

| | | | |
|---|---|---|---|
| 3,418,354 | 12/1968 | Wheeler | 260/33.2 |
| 3,823,201 | 7/1974 | Pizzini et al. | 260/33.2 |
| 3,850,861 | 11/1974 | Fabris et al. | 260/33.2 |
| 3,953,393 | 4/1976 | Ramlow et al. | 260/33.2 |
| 4,148,840 | 4/1979 | Shah | 260/33.2 |
| 4,186,271 | 1/1980 | Preston et al. | 568/38 |
| 4,202,947 | 5/1980 | Preston et al. | 521/137 |
| 4,208,314 | 6/1980 | Priest et al. | 260/33.2 |
| 4,233,425 | 11/1980 | Terfertiller et al. | 525/455 |
| 4,242,249 | 12/1980 | VanVlece et al. | 260/33.2 |
| 4,282,331 | 6/1981 | Priest | 521/137 |
| 4,342,840 | 8/1982 | Kozawa et al. | 521/137 |
| 4,390,645 | 6/1983 | Hoffman et al. | 521/137 |
| 4,394,491 | 7/1983 | Hoffman et al. | |
| 4,454,255 | 6/1984 | Ramlow et al. | 521/137 |
| 4,458,038 | 7/1984 | Ramlow et al. | 521/137 |
| 4,460,715 | 7/1984 | Hoffman et al. | 521/137 |
| 4,477,603 | 10/1984 | Fisk | 521/137 |

FOREIGN PATENT DOCUMENTS

| | | |
|---|---|---|
| 0000503 | 2/1979 | European Pat. Off. . |
| 0063832 | 11/1982 | European Pat. Off. . |
| 101494 | 11/1973 | Japan . |
| 5887 | 6/1977 | Japan . |
| 0022060 | 2/1982 | Japan . |
| 1126025 | 9/1968 | United Kingdom . |
| 2053933 | 2/1981 | United Kingdom . |

OTHER PUBLICATIONS

"Para-Methylstyrene" Kaeding and Barile, New Monomers and Polymers, Plenum Press, New York, 1984, pp. 223-241 Mobil PMS Monomer, Technical Bulletin, Jan. 1982.

"Paramethylstyrene" Kaeding, Young, Prapas, Chemtech, 1982, 12, pp. 556-562.

"A Better Styrene Goes Commercial", Chemical Week, Feb. 17, 1982, pp. 42-46.

*Primary Examiner*—Maurice J. Welsh
*Attorney, Agent, or Firm*—Paul W. Leuzzi

[57] ABSTRACT

Stable dispersions of poly(para-methylstyrene), poly(vinyltoluene) and other substituted styrenes can be made in polyether polyols and thereafter formed into polyurethanes. The polymer/polyols made from substituted styrenes have low viscosity and good particle size and distribution.

21 Claims, No Drawings

POLYMER/POLYOLS OF SUBSTITUTED STYRENES AND POLYURETHANES MADE THEREFROM

BACKGROUND OF THE INVENTION

1. Field of the Invention

The instant invention relates to a novel class of stable dispersions of a polymer in a polyol hereinafter called polymer/polyols) which can react with organic polyisocyanates to form polyurethane products. The invention also relates to novel polyurethane products prepared from such polymer/polyol. More specifically, this invention relates to a class of polymer/polyols prepared from substituted styrenes. It has surprisingly been found that substituted styrenes provide stable dispersions in a polyol, even when no greater than 20% acryonitrile is present as a comonomer, without adversely affecting the physical properties of the polymer/polyol or resulting polyurethane.

2. The Prior Art

The basic technology for the preparation of polymer/polyol dispersions useful in producing polyurethane foams, elastomers and the like is described in U.S. Pat. Nos. 3,304,273, 3,383,351, Re. 28,715 and Re. 29,118 to Stamberger. Such dispersions can be produced by polymerizing one or more olefinically unsaturated monomers dissolved or dispersed in a polyol in the presence of a free radical catalyst. Polymer/polyol dispersions, when used in producing polyurethane foams and elastomers, impart higher load bearing properties to polyurethane foams and elastomers than are exhibited by such products prepared from unmodified polyols.

Recently, polymer/polyols having higher styrene contents have become commercially attractive. Unfortunately, it is impossible to obtain high styrene contents without there occurring a corresponding loss in physical properties. The physical properties significantly affected by the styrene content are viscosity, dispersed polymer particle morphology, and potential solids level. Nonetheless, the art is replete with reference to styrenes as a monomer or comonomer useful in making polymer/polyols.

To list but a few of these references are Example 47 of U.S. Pat. No. 4,148,840; Example 53 of U.S. Pat. No. 4,242,249; Example 11 of U.S. Pat. No. 4,233,425; Example 60 of U.S. Pat. No. 4,454,255 and Example 44 of U.S. Pat. No. 4,458,038.

However, the art has failed to appreciate the unexpectedly superior abilities of the substituted styrenes monomer. Although a passing reference to these materials is generally found in most polymer/polyol patents, they have largely been ignored. Indeed, the only known examples to a substituted styrene are found in U.S. Pat. No. 4,458,038 as comonomers with acrylonitrile.

The unexpectedly superior performance of these substituted styrenic materials in polymer dispersions and their conversion into polyurethanes represent an advance over the existing technology and the potential for improved products.

OBJECTIVES OF THE INVENTION

One object of the present invention is to provide a stable polymer/polyol with the polymer having less than 20% acrylonitrile content.

Another object of the present invention is to provide a polymer/polyol having low viscosity and good particle size and size distribution.

Another object of the present invention is to provide a polymer/polyol with a high solids potential.

Yet another object of the present invention is to provide a polyurethane having high load bearing properties and good scorch resistance from a high styrene based polymer/polyol.

Other objects of the present invention will become apparent from the detailed disclosure and examples set forth herein.

SUMMARY OF THE INVENTION

The present invention provides a novel class of polymer/polyols wherein the polymer is prepared in situ in the polyol from monomers comprising of the general formula:

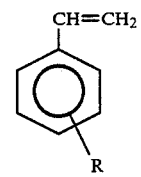

where R is not in the ortho position and is an alkyl group with the proviso that in those instances where comonomers are employed, no greater than 20% acryonitrile should be present.

These substituted styrenes have surprisingly been found to make stable, low viscosity polymer/polyols having high solids which are convertable to polyurethanes having acceptable physical properties.

DETAILED DESCRIPTION OF THE INVENTION

The stable polymer/polyol dispersions of this invention contain a polyol, a substituted styrene and potentially other monomers.

Recently, the term "polyahl" has been employed in the art to connote any polyfunctional compound wherein at least two of the functional groups are active hydrogen moieties capable of reacting with an isocyanate moiety to form a polyurethane, polyurea and the like. See U.S. Pat. No. 4,390,645. However, it is felt that the term "polyol" is well known to encompass active-hydrogen containing moieties other than hydroxyl groups, and as such, the term polyol as used herein is intended to include any polyfunctional compound wherein at least two of the functional groups are active-hydrogens according to the Zerewitinoff test. See U.S. Pat. No. 3,304,273.

Illustrative of the polyols useful in producing polymer/polyol compositions in accordance with this invention are the polyhydroxyalkanes, the polyoxyalkylene polyols, the polyoxyalkylene polyesters, amine-terminated polyoxyalkylene polyols or the like. Among the polyols which can be employed are those selected from one or more of the following classes of compositions, alone or in admixture, known to those skilled in the polyurethane art:

(a) alkylene oxide adducts of polyhydroxyalkanes;
(b) alkylene oxide adducts of non-reducing sugars and sugar derivatives;

(c) alkylene oxide adducts of phosphorus and polyphosphorus acids;

(d) alkylene oxide adducts of polyphenols;

(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,4-dihyroxybutane, and 1,6-dihyroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide and propylene oxide adducts of trihyroxyalkanes.

The polyols employed can have hydroxyl numbers which vary over a wide range. In general, the hydroxyl numbers of the polyols employed in the invention can range from about 20 to about 250. The hydroxyl number is defined as the number of milligrams of potassium hydroxide equivalent to the hydroxyl content of one gram of polyol. The hydroxyl number can also be defined by the equation:

$$OH\ No. = (56.1 \times 1000 \times f)/m.w. \qquad (A)$$

where
OH No. = hydroxyl number of the polyol;
f = functionality, that is, the number of hydroxyl groups per molecule of polyol;
m.w. = number average molecular weight of the polyol.

The particular polyol employed depends upon the end-use of the polyurethane product to be produced. The molecular weight or the hydroxyl number is selected properly to result in flexible or semi-flexible foams or elastomers when the polymer-polyol dispersion produced from the polyol is converted to a polyurethane. The polyols preferably possess a hydroxyl number of from about 50 to about 250 for semi-flexible foams, and from about 20 to about 70 for flexible foams. Such limits are not intended to be narrowly restrictive, but are merely illustrative of the large number of possible combinations of the above polyol coreactants.

If desired, a polyol blend containing a small amount of a high molecular weight polyol and a major amount of a low or a medium molecular weight polyol can be used. Also, a polyol-polymer/polyol blend containing a small amount of a polymer/polyol (prepared in a high molecular weight polyol) and a major amount of a low or a medium molecular weight polyol, as disclosed in U.S. Pat. No. 4,148,840, can be used as the polyol component.

The most preferred polyols employed in this invention include the poly(oxypropylene)glycols, triols, higher functionality polyols and any of these that are capped with ethylene oxide. These polyols also include poly(oxypropyleneoxyethylene)polyols; however, desirably, the oxyethylene content should comprise less than 80 percent of the total and preferably less than 60 percent. The ethylene oxide, when used, can be incorporated in any fashion along the polymer chain. Stated another way, the ethylene oxide can be incorporated either in internal blocks, as terminal blocks, randomly distributed along the polymer chain, or a combination thereof. As is well known in the art, the polyols that are most preferred herein contain varying small amounts of unsaturation. As taught by Stamberger (U.S. Pat. Nos. 3,304,273, 3,383,351, and Re. 28,715), unsaturation in itself does not affect in any adverse way the formation of the polymer/polyols in accordance with the present invention except in the case where the extent or type of unsaturation is so high or effective as to result in a dispersion of the polymer in a polyol that is gelled. Thus, small amounts of unsaturation can be incorporated into the polyol without departing from the scope of the present invention.

The substituted styrene employed as a monomer or comonomer in the present invention is of the general formula:

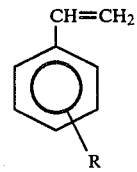

where R is not in the ortho position and is an alkyl group containing one to four carbon atoms and R may be substituted or unsubstituted, with halogens other than iodine as the preferred substituent. Preferably R is methyl, ethyl or a halogen substituted methyl group.

The substituted styrenes utilized in the present invention are commercially available, i.e., paramethylstryene is available from Mobil as their PMS monomer and vinyltoluene or vinyl benzyl chloride both from Dow. Recent developments in zeolite catalysts have enabled PMS to be made in high selectivity by an acid-catalyzed alkylation of toluene with ethylene which is subsequently dehydrogenated to the substituted styrene. (*New Monomers and Polymers*, Plenum Press, 1984, pp. 223 to 241.)

Suitable comonomers include acrylonitrile, styrene, acrylates, methacylates, methacryonitrile and the like. For a more detailed list of comonomers, reference is made to U.S. Pat. Nos. 3,931,092 and 4,093,573. It should be noted, however, that no more than 20% acryonitrile is desired in the present invention. Correspondingly, it is preferred that no more than 20% of any comonomer be present.

The total polymer content dispersed in the polyol should be from 5 to 55 weight percent based on the total weight of the dispersion, preferably from 20 to 35 weight percent.

The polymerization can also be carried out with an inert organic solvent present. One requirement in the selection of the solvent is that it does not dissolve the copolymer. When an inert organic solvent is used, it is generally removed from the reaction mixture by conventional means before the polymer/polyol dispersion of this invention is used to produce polyurethane foams.

The catalysts useful in producing the copolymer/polyol dispersions are the well known free radical type vinyl polymerization catalysts for the formation of polymer/polyols, for example, peroxides, azo compounds, such as azobisisobutyronitrile, and mixtures thereof.

The catalyst concentration useful should range from about 0.1 to about 5.0 weight percent based on the total feed to the reactor and preferably from about 0.3 to about 1.0. Although, as mentioned above, any free-radical type vinyl polymerization catalyst can be used, 2,2'-azobis(isobutyronitrile) is preferred because it does not increase the acid number of the product, does not impart an objectionable odor to the product, and does not require special handling, as compared to certain peroxide catalysts.

The temperature used in producing the copolymer/polyol dispersions is any temperature at which the catalyst has a desirable rate of decomposition under the reaction conditions. In the case of a continuous process, reaction temperatures of greater than 100° C. are preferred. The maximum temperature used is not narrowly critical but should be lower than the temperature at which significant decomposition of the product occurs. By way of illustration, 2,2'-azobis(isobutyronitrile) has a preferred temperature range from 105° C. to 135° C.

Temperatures at which the half life of the catalyst is no longer than about six minutes are desirable. Temperatures of typical catalysts with half lives of six minutes are:

| Catalyst | Temperature (°C.) |
| --- | --- |
| Azobisisobutyronitrile | 100° C. |
| Lauroyl Peroxide | 100° C. |
| Decanoyl Peroxide | 100° C. |
| Benzoyl Peroxide | 115° C. |
| p-Chlorobenzoyl Peroxide | 115° C. |
| t-Butyl Peroxyisobutyrate | 115° C. |
| Acetyl Peroxide | 105° C. |
| Propionyl Peroxide | 102° C. |
| 2-t-Butylazo-2-cyanobutane | 129° C. |

Chain transfer agents may be added in an amount from about 0.1 to 10 weight percent or more based on the total feed to the reactor and preferably from about 1 to 5 weight percent. Suitable chain transfer agents include any material that exhibits chain transfer activity. Useful classes of chain transfer agents include mercaptans, ketones, alcohols, aldehydes, halogenated compounds, benzene derivatives and the like. Chain transfer agents selected from among such classes may be used alone or in combination.

The crude polymer/polyol compositions usually contain small amounts of unreacted monomers. Such residual monomers can be converted to additional polymer by employing either a multi-stage operation in a continuous process or an extended cookout time in a semi-batch process. In the event that there are small amounts of unreacted monomers left, they can be removed by using a subsequent stripping step.

In order to be commercially acceptable, a polymer/polyol composition must have a reasonable degree of dispersion stability. The stability should be sufficient to allow for relatively long-term storage without the loss of processability. The polymer/polyol compositions must possess sufficiently small particles so that filters, pumps, and similar components in reactors, foaming and/or elastomer production equipment do not become plugged or fouled in short periods of time. A stable dispersion of the polymer particles in the polyol is of prime consideration in insuring that the polymer/polyols can be processed in commercial production equipment without the necessity of additional mixing to insure homogeneity.

It has been recognized that the stability of polymer/polyols requires the presence of a minor amount of a graft or addition copolymer which is formed in situ from the polymer and the polyol. It has been found recently that stability can be achieved also with a preformed copolymeric stabilizer, as disclosed for example in U.S. Pat. No. 4,242,249; or with an unsaturated polyol or macromonomer such as disclosed in U.S. Pat. Nos. 4,454,255; and 4,458,038.

Stability has been achieved by employing a free-radical catalyst and utilizing process conditions which promote rapid conversion of monomer to polymer. In practice, a lower monomer to polyol ratio is maintained by control of the reaction temperature and mixing conditions in the case of a continuous or a semi-batch operation and, in the case of a semi-batch operation, by slow addition of the monomer to the polyol. A back-mixed reactor keeps the reaction mixture relatively homogeneous and so prevents localized high monomer to polyol ratios. The catalyst and temperature are chosen so that the catalyst has a desirable rate of decomposition with respect to residence time in the reactor for a continuous process or to the feed time for a semi-batch process. The half-life of the catalyst at the temperature utilized should be short compared to the time the reactants are in the reaction zone.

Another factor known to affect stability is the molecular weight of the polyol. Generally, the higher the molecular weight, the better the dispersion stability. In case of low molecular weight polyols, the dispersion stability can be improved by using either the polyol blend technique as disclosed in U.S. Pat. No. 4,119,586 or the polyol-polymer/polyol blend technique as disclosed in U.S. Pat. No. 4,148,840.

Another aspect of the invention provides novel polyurethane products produced by reacting: (a) a polymer/polyol composition of this invention or mixtures thereof either alone or in combination with other polyols and/or polymer/polyol compositions not of this invention and (b) an organic polyisocyanate in the presence of (c) a catalyst. The reaction can be performed in any suitable manner, such as by the prepolymer or one-shot technique. When the polyurethane is a foam, the reaction mixture usually also contains a polyol, such as the one used to make the polymer/polyol, a blowing agent, and a foam stabilizer.

The organic polyisocyanates that are useful in producing polyurethanes in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanatotoluene, 3,5-diisocyanato-o-xylene, 4,6-diisocyanato-m-xylene, 2,6-diisocyanato-p-xylene, 2,4-diisocyanato-1-chlorobenzene, 2,4-diisocyanate-1-nitrobenzene, 2,5-diisocyanate—nitrobenzene, 4,4'-diphenylmethylene diisocyanate; 3,3'-diphenylmethylene diisocyanate; and polymethylene poly(phenyleneisocyanates) having the formula:

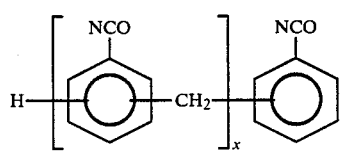

wherein x has an average value from 1.1 to 5 inclusive (preferably from 2.0 to 3.0). The preferred polyisocyanates are a mixture of 80% 2,4-tolylene diisocyanate and 20% 2,6-tolylene diisocyanate (hereinafter TDI); a mixture that is about 80% TDI and about 20% of a polymeric polymethylene polyphenyl isocyanate (MDI) of the formula:

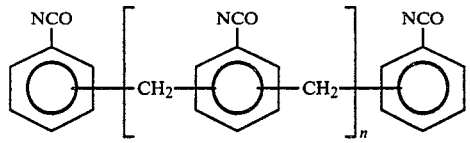

where n ranges from 0 to 2 (preferably about 0.6), liquid MDI is obtainable commercially from UpJohn and is disclosed in further detail in U.S. Pat. No. 3,384,653; and all MDI polyisocyanates.

The catalysts that are useful in producing polyurethane in accordance with this invention include: tertiary amines, such as bis(N,N'-dimethylaminoethyl)ether, trimethylamine, triethylamine, N-methylmorpholine, N-ethylmorpholine, N,N-dimethylethanolamine, N,N,N'N'-tetramethyl-1, 3-butanediamine, triethanolamine, 1,4-diazabicyclo[2.2.2]octane, pyridine oxide, and the like and organotin compounds, such as dialkyltin salts of carboxylic acids, e.g., dibutyltin diacetate, dibutyltin dilaurate, dibutyltin maleate, dilauryltin diacetate, dioctyltin diacetate, and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin dichloride, and the like. Moreover, divalent tin compounds, such as stannous octoate, stannous oleate and stannous acetate may be employed. The catalysts are employed in small amounts, for example, from about 0.001 percent to about 5 percent based on weight of the reactants.

The blowing agents useful in producing polyurethane foams in accordance with this invention include water and halogenated hydrocarbons, such as trichloromonofluoromethane, dichlorodifluoromethane, dichloromonofluoromethane, dichloromethane, methylene chloride, trichloromethane, 1,1-dichloro-1-fluoroethane, 1,1,2-trichloro-1,2,2-trifluoromethane, hexafluoro-cyclobutane, octafluorocyclobutane, and the like. Another class of blowing agents include the thermally-unstable compounds which liberate gases upon heating, such as N,N'-dimethyl N,N'-dinitrosoterephthalamide, amine formates and the like. The generally preferred method of foaming for producing flexible foams is the use of water or a combination of water plus a fluorocarbon blowing agent, such as trichloromono fuoromethane. The quantity of blowing agent employed will vary with factors such as the density desired in the foamed product.

The foam stabilizers useful in producing polyurethane foams in accordance with this invention include "hydrolyzable" polysiloxane-polyoxyalkylene block copolymer such as the block copolymers described in U.S. Pat. Nos. 2,834,748 and 2,917,480. Another useful class of foam stabilizers includes the "non-hydrolyzable" polysiloxane-polyoxyalkylene block copolymers such as the block copolymers described in U.S. Pat. Nos. 3,505,377 and 3,686,254 and British Patent Specification No. 1,220,471. Yet another useful class of foam stabilizers is composed of the cyanonalkyl-polysiloxzines, as described in U.S. Pat. No. 3,905,924.

Polyurethane products produced in accordance with this invention are useful in the applications in which polyurethanes made from conventional polymer/polyol compositions are employed such as foams and elastomers. The polymer/polyol compositions of this invention are particularly useful in the production of foams for use in arm rests, furniture, mattresses, automobile seats, carpet underlay, packaging and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

POLYMER/POLYOL PREPARATION

The polymer/polyol compositions of the Examples were prepared continuously (unless stated to the contrary) in a tank reactor fitted with baffles and an impeller. The feed components were pumped into the reactor continuously after going through an inline mixer to assure complete mixing of the feed components before entering the reactor. The internal temperature of the reactor was controlled to within one degree Centigrade. The contents of the reactor were well mixed. The product flowed out of the reactor continuously through a back pressure regulator that had been adjusted to give some positive back pressure in the reactor. Portions of the crude product were vacuum stripped at 2 millimeters absolute pressure and 120° to 130° C. for testing. Conversions were determined from analysis of the amount of unreacted monomers present in the product after stripping. For the experiments described, the reactor was operated with a 12 minute residence time, at 125° C. with a reactor pressure of 45 psi. The impeller is driven by a variable speed DC motor set at about 1200 rpm. The reactor is fed by two Fluid Metering Inc. (FMI) pumps Model RP-5Y2-2SY; one for monomer, one for polyol.

DEFINITIONS

As used in the Examples appearing below, the following designations, symbols, terms and abbreviations have the indicated meanings.

"Theoretical molecular weight" of a polyol denotes a number average molecular weight calculated using equation (A) above based on the functionality of the starter used to produce the polyol and the experimentally determined hydroxyl number of the polyol.

"Triol" or "Diol" denotes the nominal functionality of a polyol based on the functionality of the starter. Actual polyol functionalities are somewhat lower (3 to 20% lower) than nominal functionality because of the presence of some amount of lower functionality material produced by side reactions. These side reactions are more significant the higher molecular weight of the polyol being produced.

Polyol I—A polyalkylene oxide triol, produced from propylene and ethylene oxides and glycerine and having a hydroxyl number of about 35. 16.5 wt. % ethylene oxide is used to "cap" the triol.

Polyol II—A 5000 molecular weight amine terminated triol from Texaco under the trade designation Jeffamine ™ T-5000.

Polyol III—A polyalkylene oxide triol, produced from propylene and ethylene oxides and glycerine. The product contains 10 weight percent ethylene oxide and has a hydroxyl number of 52.

Polyol IV—A polymer/polyol containing 41 weight percent total solids having a 33/67 acrylonitrile/styrene ratio dispersed in 59 weight percent of a mixture of Polyol III and Stabilizer A.

Polyol V—A polyalkylene oxide triol, produced from propylene and ethylene oxides and glycerine. The product contains 8 weight percent ethylene oxide and has a hydroxyl number of 58.

Polyol VI—A polymer/polyol containing 28 weight percent total solids having a 33/67 acrylonitrile/styrene ratio dispersed in 72 weight percent of a mixture of Polyol I and Stabilizer A.

Stabilizer A—A polyalkylene oxide triol produced from propylene and ethylene oxides and glycerine and having a hydroxyl number of about 34. 15 wt. % ethylene oxide is used to "cap" the triol. The triol is then reacted with maleic anhydride and tipped with ethylene oxide.

AIBN—2,2'-azobis(isobutyronitrile)

DEOA—Diethanolamine

SO—Stannous octoate

Catalyst A—Mixture of bis(dimethylaminoethyl) ether (70 wt. %) and dipropyleneglycol (30 wt. %)

Catalyst B—Diazobicyclooctane

Catalyst C—Dibutyl tin dilauryl sulfide

Silicone Surfactant A—A silicone surfactant available from Union Carbide Corporation under the trade designation Y-10,184.

Silicone Surfactant B—A silicone surfactant available from Union Carbide Corporation under the trade designation L-5750.

TDI—A mixture of 80% 2,4-tolylene diisocyanate and 20% 2,6-tolylene diisocyanate.

Polymeric-isocyanate—A polymethylene-poly(phenyleneisocyanate) having an average of 2 to 3 repeating methylenephenyleneisocyanate units.

IFD—Indentation force deflection

CFD—Compression force deflection

EXAMPLE 1

Preparation of Poly(para-methylstyrene) Polymer/Polyol

The feed to the laboratory back mix reactor was pumped from two reservoirs by FMI pumps. The feeds were mixed by passing through a static mixer just before entering the reactor. Feed rates were adjusted to give the reaction mixture at 12 minute residence time in the reactor. The reaction feed mixture was 24.9 percent para-methylstyrene, 67.2 percent Polyol I and 7.5 percent Stabilizer A. Polyol and stabilizer were pumped from one reservoir and monomer containing 0.4 percent AIBN initiator based on total feed. Product was collected in a five liter round bottom flask purged with nitrogen. Product was collected over a period of 1½ hours after the feed had been lined out.

The collected product was stripped by standard procedures at 135° C. Material stripped from the product was collected in cold traps at dry ice temperature. The polymer/polyol contained 23.0 percent polymer solids by mass balance calculation after stripping. After stripping monomer conversion was greater than 90 percent and the stripped product contained 0.9 weight percent free para-methylstyrene.

The polymer/polyol had a light transmission, as measured in U.S. Pat. No. 4,463,107, in DMF of 99.6 percent. The shape of the particle was spherical and smooth. Reverse Cannon-Fenske viscosity at 25° C. was 3159 cks and the polymer/polyol hydroxyl number was 26.9

Comparative A

Preparation of Polystyrene Polymer/Polyol

The procedure followed in Example 1 was repeated feeding unsubstituted styrene monomer instead of the methylstyrene. The reaction mixture feed was 24.9 percent styrene, 67.2 percent Polyol I, 7.5 percent Stabilizer A and 0.4 percent AIBN initiator.

By mass balance, polymer solids of this polystyrene polymer/polyol was about 16 percent. Light transmission in DMF was essentially 100 percent. Reverse Cannon-Fenske viscosity at 25° C. as 5344 cks. The shape of the particle was very irregular. Thus at approximately half the solids content (and correspondingly about half the conversion) of Example 1, twice the viscosity occurred.

EXAMPLE 2

Preparation of Poly(Para-methylstyrene) Polymer/Polyol

The procedure followed in Example 1 was repeated. The feed to the reactor was 24.9 percent p-methylstyrene, 67.2 percent Polyol I, 7.5 percent Stabilizer A and 0.4 percent AIBN initiator based on total feed. Stripped product contained 0.7 percent free monomer. Calculated polymer solids after stripping was 23.9 percent. Light transmission in toluene was 99.6 percent. Reverse Cannon-Fenske viscosity at 25° C. was 2839 cks.

This polymer/polyol was converted into molded polyurethane foam for physical testing as reported in Table I below.

TABLE I

|  | Foam I | Foam II |
|---|---|---|
| Foam Formulation | | |
| Polyol I | 60 php | 60 |
| Polymer/polyol VI | 40 | — |
| Polymer/polyol of Example 2 | — | 40 |
| H$_2$O | 3.1 | 3.1 |
| DEOA | 1.5 | 1.5 |
| Catalyst A | 0.1 | 0.1 |
| Catalyst B | 0.4 | 0.4 |
| Catalyst C | 0.005 | 0.005 |
| Silicone Surfactant A | 1.0 | 1.0 |
| TDI (103 Index) | 39.94 | 39.94 |
| Properties of the Resulting Foam | | |
| Density | 2.11 lb/cu ft | 2.28 lb/cu ft |
| Porosity | 26.6 CFM/sq ft | 23.9 CFM/sq ft |
| Resiliency | 68% | 64% |
| IFD$_{25}$ | 24.5 lbs | 28.25 lbs |
| IFD$_{65}$ | 75 lbs | 78 lbs |
| Return Value | 80.65 | 83.2% |
| Load Ratio 65/25 | 3.06 | 2.76 |
| Tensile Strength | 17.7 psi | 18.9 psi |
| Elongation | 105.8% | 120.8% |
| Tear Resistance | 1.3 lb/in | 1.4 lb/in |
| Compression Set | 6.9% | 8.9% |
| Humid Age Compression Set | 21% (typical value) | 26.7% |

EXAMPLE 3

Preparation of a Higher Solids Polymer/Polyol of para-Methylstyrene

The procedure of Example 1 was again followed. The feed to the reactor was 39.2 percent by weight of para-methylstyrene, 3.0 percent of Stabilizer A, 57.2 percent of Polyol III and 0.6 percent of AIBN initiator. After stripping, calculated polymer solids was 36 percent. The polymer/polyol had a light transmission in toluene of essentially 100 percent and in DMF, 98.1 percent. The Reverse Cannon-Fenske viscosity of the product at 25° C. was 9152 cks.

This polymer/polyol was submitted for conversion into free-rise foam and physical testing the results of which are set forth in Table II.

TABLE II

|  | Foam III | Foam IV |
|---|---|---|
| Foam Formulation | | |
| Poly(para-methyl-styrene) of Example 3 | 100 php | — |
| polymer polyol IV | — | 87.4 |
| polyol V | — | 12.6 |
| H$_2$O | 2.3 | 2.3 |
| Catalyst A | 0.05 | 0.05 |
| Silicone Surfactant B | 0.9 | 0.9 |
| SO | 0.11 | 0.11 |
| TDI (110 Index) | 30.85 | 30.85 |
| Cream Time | 9 seconds | 9 seconds |
| Rise Time | 130 seconds | 130 seconds |
| Appearance | Good | Good |
| Properties of the Resulting Foam | | |
| Density | 2.38 lb/cu. ft. | 2.39/cu. ft. |
| Porosity | 48.2 CFM/sq. ft. | 21.2 CFM/sq. ft. |
| IFD 25 | 111.6 lbs. | 104.1 lbs. |
| 65 | 205.9 lbs. | 181.2 lbs. |
| 25 ret | 71.6 lbs. | 67.9 lbs. |
| Load ratio | 1.84 | 1.74 |
| Tensile (average of 6) | 18.0 psi | 22.8 psi |
| Elongation | 50.0% | 73.3% |
| Tear | 1.23 lb/in. | 1.57 lb/in. |
| Compression Set | 3.1% | 1.0% |
| CFD$_{25}$ | 1.25 psi | 1.20 psi |
| CFD$_{65}$ | 2.55 psi | 2.35 psi |

EXAMPLE 4

Preparation of a Poly(vinyltoluene) Polymer/Polyol

The procedure of Example 1 was followed. Feed to the continuous back-mix, laboratory reactor was 27.8 percent by weight of vinyl toluene, 7.2 percent of Stabilizer A, 64.6 percent of Polyol I and 0.4 percent by weight of AIBN initiator. After stripping, the calculated polymer solids in the poly(vinyltoluene) polymer polyol was 22.4 percent. The polymer/polyol had a reverse Cannon-Fenske viscosity of 3770 cks. Light transmission in toluene was 99.9 percent.

EXAMPLE 5

Preparation of a Copolymer Polyol of 50/50 Styrene/p-Methylstyrene

The procedure of Example 1 was again followed. Feed to the reactor was 13.8 percent styrene monomer, 13.8 percent p-methylstyrene, 7.2 percent Stabilizer A, 64.8 percent Polyol I and 0.4 percent AIBN initiator. After stripping, polymer solids in this copolymer polyol were 20 percent. The reverse Cannon-Fenske viscosity at 25° C. was 7680 cks.

EXAMPLE 6

Preparation of Poly(para-methylstyrene) Polymer Polyol in a Two-Stage Reaction Configuration Poly(para-methylstyrene) polymer/polyol was made as as set forth in Example 1. Feed to the reactor was 24.9 percent para-methylstyrene, 7.5 percent Stabilizer A, 67.2 percent Polyol I and 0.4 percent of AIBN initiator.

Product from the reactor was collected during a 1½ hour period. The hot product from the reactor (125° C.) was collected in the stirred vessel also maintained at 125° C. with a heating mantle. After the continuous reactor was shut down, the product in the stirred glass vessel continued to be stirred slowly at 125° C. for one hour. In effect, the reactor configuration was a two stage reactor: continuous/semi-batch. After the product collection was complete and the stirred, semi-batch reactor had continued for one hour, the product was left in the semi-batch reactor under a nitrogen purge and thereafter the crude product was stripped.

After stripping at 125° C., the product conversion was measured to be 84.3% by mass balance. This polymer/polyol had a calculated polymer solids of 22 percent, light transmission in toluene of 95.2 percent and a reverse Cannon-Fenske viscosity at 25° C. of 4932 cks.

EXAMPLES 7 AND 8

Poly(chloromethylstyrene) Polymer/Polyols

Two polymer/polyols were prepared in a two-stage reactor configuration, continuous-semi-batch as set forth in Example 5. The feed to the first, continuous stage was 27.9 percent monomer, 7.2 percent Stabilizer A, 64.5 percent Polyol I and 0.4 percent AIBN initiator. In one case, the monomer feed was 85 percent para-methylstyrene and 15 percent chloromethylstyrene and in the other case the monomer feed was all chloromethylstyrene. The results are set forth in Table III.

TABLE III

| Paramethyl styrene | 85 | — |
|---|---|---|
| Chloromethyl styrene | 15 | 100 |
| p-methylstyrene in stripped product | 0.3% | — |
| percent chlorione (Schwartzkopf Microanalytical Laboratory) | 1.1% | 6.1% |
| Calculated Theoretical percent chlorine | 0.9% | 5.8% |
| Calculated Polymer Solids | 25.3% | 25.1% |
| Calculated Monomer Conversion (Final) | 87.7% | 87.0% |
| Reverse Cannon-Fenske Viscosity, 25° C. | 20,625 cks | 4358 cks |
| Light transmission in DMF | 96.4% | 9.0% |

EXAMPLE 9

The procedure followed to make paramethyl styrene polymer/polyol in Example 1 was repeated feeding 64.6% Polyol II, 27.8% paramethyl styrene, 7.2% Stabilizer A and 0.4% AIBN initiator. Product was collected over 2 hours at 125° C. Free monomer analysis by gas chromatographic showed 0.59% weight percent para-methylstyrene after stripping. The polymer/- polyol contained 25% solids by mass balance calculation after stripping. Conversion was greater than 89 percent. The reverse Cannon-Fenske viscosity at 25° C. was 7405 cks.

|  | Foam V | Foam VI |
|---|---|---|
| Formulation: | | |
| Polyol I | 60 php. | 60 php. |
| Polyol II | 40 | — |
| Polymer/Polyol of Example 9 | — | 40 |
| Water | 3.8 | 3.8 |
| DEOA | 1.7 | 1.7 |
| C-220 | 0.08 | 0.08 |
| Catalyst B | 0.08 | 0.08 |
| D-8118 | 0.18 | 0.18 |
| C-120 | 0.03 | 0.03 |
| Y-10197 | 1.8 | 1.8 |
| TDI | 100 index | 100 index |
| Foam Properties: | | |
| Density, lb/cu. ft. | 2.06 | 2.05 |
| Resiliency, % | 68 | 63 |
| Porosity, CFT/Sq. ft. | 34.68 | 26.60 |
| IDF, psi 25% | 41.75 | 43.25 |
| 65% | 105.25 | 108.75 |
| Tensile Strength, psi. | 24.69 | 23.58 |
| Elongation, % | 131.55 | 128.61 |
| Tear Strength, psi. | 1.52 | 2.10 |
| Compression Set, 76%, % | 15.71 | 18.92 |
| Dry Heat Aging, % | −2.5 | −8.1 |

EXAMPLE 10

To a one-liter Morton flask equipped with a condenser and a mechanical stirrer there was added 337.5 g of Polyol I and 37.5 g of Stabilizer A. The temperature was maintained at 125° C. under nitrogen. To this mixture there was added a mixture of 125 g of paramethyl styrene and 2.0 g of azo-bis-isobutyronitrile slowly over 70 minutes. The mixture was maintained at 125° C. for 4 hours after the addition was complete. The final monomer concentration was 3.90% paramethylstyrene to give 21% solids. The reverse Cannon-Fenske viscosity of the final product after stripping out the unreacted monomer was 2750 cks. at 25° C.

I claim:

1. A polymer/polyol dispersion which is useful in the preparation of polyurethanes comprising:
   (a) a polyol having a hydroxy number from about 20 to about 250; and
   (b) a polymer containing a substituted styrene monomer of the general formula

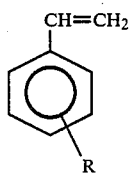

where R is not in the ortho position and is an alkyl group containing one to four carbon atoms and may be substituted or unsubstituted, wherein the total amount of polymer dispersed in the polyol is from about 5 to 55 weight percent, based on the total weight of the dispersion with the proviso that the polymer contain less than 20 weight percent, based on the total weight of the polymer, of acrylonitrile when comonomers are employed.

2. The polymer/polyol dispersion of claim 1 wherein R is methyl, ethyl or a halogen substituted methyl group.

3. The polymer/polyol dispersion of claim 1 wherein a comonomer is employed.

4. The polymer/polyol dispersion of claim 3 wherein the comonomer is styrene.

5. The polymer/polyol dispersion of claim 1 wherein the substituted styrene is paramethylstyrene.

6. The polymer/polyol dispersion of claim 1 wherein the substituted styrene is vinyltoluene.

7. The polymer/polyol dispersion of claim 1 wherein the substituted styrene is chloromethylstyrene.

8. The polymer/polyol dispersion of claim 1 wherein the polyol is a polyalkylene oxide triol.

9. The polymer/polyol dispersion of claim 1 wherein the polyol is an amine terminated triol.

10. The polymer/polyol dispersion of claim 1 wherein the polymer is free-radical initiated.

11. A method for producing a polyurethane which comprises reacting (a) a polymer/polyol dispersion with (b) an organic polyisocyanate in the presence of a catalyst for the reaction of (a) and (b) wherein the polymer/polyol dispersion is the polymer/polyol disperson of claim 1 alone or in combination with other polyols and/or polymer/polyols.

12. The method of claim 11 wherein the polyurethane is a cellular polyurethane and wherein a blowing agent is present during the reaction.

13. The method of claim 12 wherein a foam stabilizer is additionally present during the reaction.

14. The method of claim 11 wherein the organic polyisocyanate is either TDI, MDI or a mixture of the two.

15. The method of claim 1 wherein in the substituted styrene is selected from group consisting of paramethylstyrene, vinyltoluene, and chloromethylstyrene.

16. The method of claim 11 wherein the comonomer is styrene.

17. The method of claim 11 wherein the polyol is an amine terminated triol.

18. The method of claim 11 wherein the polyol is a polyalkylene oxide triol.

19. A polyurethane comprising the reaction product of claim 11.

20. A polyurethane foam comprising the reaction product of claim 12.

21. A polyurethane foam comprising the reaction product of claim 13.

* * * * *